A. H. McCLINTOCK & H. J. W. BARKER.
Stereoscopes.
No 157,337.
Patented Dec. 1, 1874.
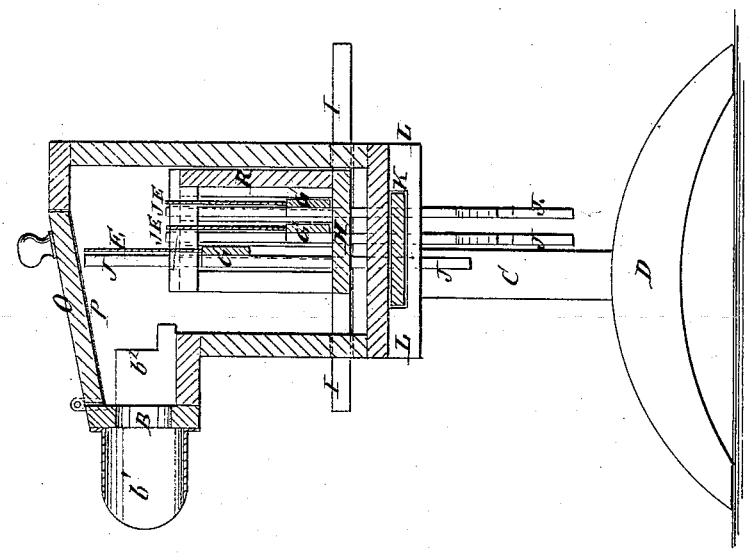
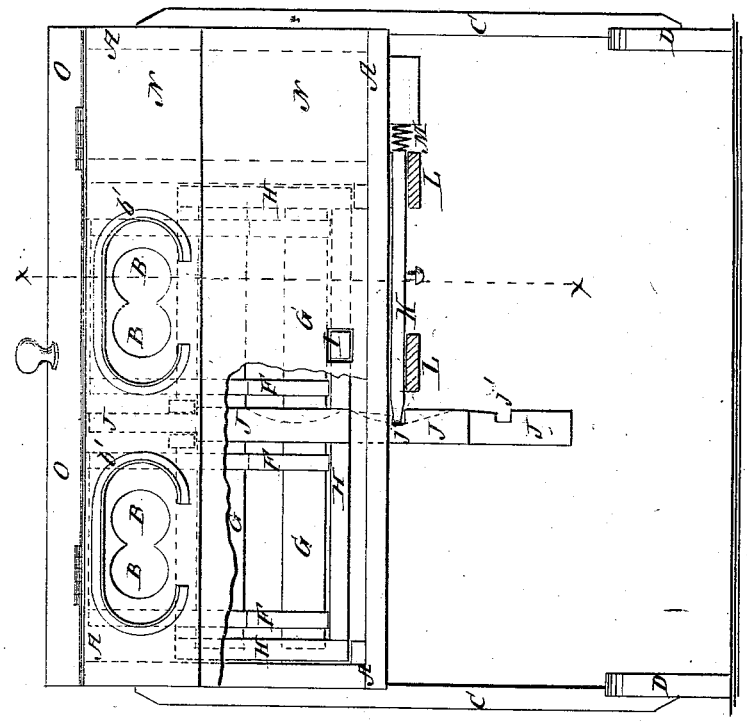
WITNESSES:
INVENTOR:

UNITED STATES PATENT OFFICE.

ABSALOM H. McCLINTOCK AND HENRY J. W. BARKER, OF FORT SCOTT, KANSAS.

IMPROVEMENT IN STEREOSCOPES.

Specification forming part of Letters Patent No. 157,337, dated December 1, 1874; application filed August 15, 1874.

*To all whom it may concern:*

Be it known that we, ABSALOM H. MCCLINTOCK and HENRY J. W. BARKER, of Fort Scott, in the county of Bourbon and State of Kansas, have invented a new and useful Improvement in Stereoscopic Apparatus, of which the following is a specification:

Figure 1 is a front view of our improved apparatus, part being broken away to show the construction. Fig. 2 is a vertical cross-section of the same, taken through the line $xx$ Fig. 1.

Our invention has for its object to furnish an improved stereoscopic apparatus designed especially for use in object-teaching in classes, which shall be so constructed that a copy of the picture may be before each pupil, which will enable all the pictures to be exhibited, replaced by others, and moved to bring them into focus at the same time and by the same operation, and which shall be simple in construction and convenient in use.

The invention will first be fully described, and subsequently pointed out in the claims.

A is a box, in openings in the front side of which are secured six, more or less, pairs of lenses, B, according to the number of pupils in the class. Each pair of lenses B is provided with a shade, $b^1$, and a division-plate, $b^2$, in the ordinary way. To the ends of the box A are attached uprights C, to the lower ends of which are attached foot-pieces D. The uprights C are designed to be of such a length that the pupils, while sitting upon their seats, can conveniently look through the lenses B. The box A is made of such a depth that the pictures E may be raised in front of the lenses B, or lowered out of the range of said lenses. The pictures E are placed in holders F, in front of each pair of lenses B, which holders F are attached to a bar, G, which moves up and down in guides formed in or attached to a box or frame, H, which slides back and forth transversely in the lower part of the box A. To the box or frame H is attached a cross-bar, I, the ends of which project through holes in the front and rear sides of the box A, for convenience in moving the said box or frame H, to bring each picture into the focus of the lenses as one set of pictures after another is raised into view. To the middle part of each of the bars G is attached a vertical bar, J, the upper end of which passes up through guides in the box or frame H. The lower parts of the bars J pass down through a transverse slot in the bottom of the box A, and against their edges rests the forward edge of the lock-plate K, which slides longitudinally along the bottom of the box A, and is kept in place by keepers L, attached to said bottom. The locking-slide K is held forward against the edges of the bar J by one or more coiled or other springs, M, which rest against the end of the slide and against a block attached to the bottom of the box A. When the pictures E are raised into the focus of the lenses B, the forward edge of the slide K enters a notch, $j'$, in the edge of the bar J, to support the pictures in place until released by drawing back the locking-slide K. The parts of the bar J that are opposite the end of the slide K when the pictures are lowered have notches with inclined sides formed in them, so that they will not prevent the slide K from moving forward to enter the notch $j'$ of the raised bar. In one end of the box A is formed a chamber, N, which may be used as a receptacle for views, &c. The cover O of the box A is hinged at its forward edge to the slide of the said box A, and to its under side is attached a reflector, P, so that by adjusting the cover O the light may be thrown upon the pictures at the proper angle to produce the best effect. The cover O may be supported by a pivoted arm or other convenient means.

Having thus described our invention, we claim as new and desire to secure by Letters Patent—

1. The combination of the picture-holders F G, having a vertical movement, and the box or frame H, having a transverse movement, with the box A, and lenses B, substantially as herein shown and described.

2. The combination of the notched vertical bars J, the sliding lock-plate K, and spring M, with the holders F G, the box or frame H, and the box A, substantially as herein shown and described.

ABSALOM H. McCLINTOCK.
HENRY J. W. BARKER.

Witnesses:
A. LECK,
A. HYDE.